United States Patent
Browning et al.

(10) Patent No.: US 11,028,598 B2
(45) Date of Patent: Jun. 8, 2021

(54) DRY-CAST LIGHTWEIGHT VENEER BLOCK, SYSTEM, AND METHOD

(71) Applicant: OLDCASTLE ARCHITECTURAL, INC., Atlanta, GA (US)

(72) Inventors: Leonard Browning, Aurora, IL (US); David Rice, Cumming, GA (US)

(73) Assignee: Anchor Wall Systems Limited, Atlanta, GA (US)

( * ) Notice: Subject to any disclaimer, the term of this patent is extended or adjusted under 35 U.S.C. 154(b) by 180 days.

(21) Appl. No.: 15/579,382

(22) PCT Filed: Jan. 29, 2016

(86) PCT No.: PCT/US2016/015798
§ 371 (c)(1),
(2) Date: Dec. 4, 2017

(87) PCT Pub. No.: WO2016/209320
PCT Pub. Date: Dec. 29, 2016

(65) Prior Publication Data
US 2018/0179762 A1 Jun. 28, 2018

Related U.S. Application Data

(60) Provisional application No. 62/185,395, filed on Jun. 26, 2015.

(51) Int. Cl.
*E04C 1/00* (2006.01)
*E04F 13/08* (2006.01)
(Continued)

(52) U.S. Cl.
CPC .......... *E04F 13/0885* (2013.01); *C04B 14/06* (2013.01); *C04B 18/027* (2013.01);
(Continued)

(58) Field of Classification Search
CPC ...... E04B 2/04; E04C 2002/008; E04C 2/044; B28B 7/0073; B28B 7/007; E04F 13/14;
(Continued)

(56) References Cited

U.S. PATENT DOCUMENTS 3,304,673 A    2/1967  Ramoneda
4,589,241 A *  5/1986  Volpenhein ........... E04F 13/147
                                                    52/315
(Continued)

FOREIGN PATENT DOCUMENTS

GB    2 413 126 A    10/2005

OTHER PUBLICATIONS

International Search Report and Written Opinion of the International Searching Authority for corresponding International Patent Application No. PCT/US2016/015798 dated Apr. 7, 2016, 10 pages.
(Continued)

*Primary Examiner* — Gisele D Ford
(74) *Attorney, Agent, or Firm* — Merchant & Gould P.C.

(57) ABSTRACT

Described are dry cast lightweight veneer blocks and a system and method of installing lightweight veneer blocks. The courses can be assembled without mortar between the courses. As an example, sides of the veneer blocks have areas that recede from an imaginary plane between adjacent veneer blocks to give a deep texturing and a shadow effect between veneer blocks. The installation system and method include a substrate, an air barrier applied to the substrate, a plurality of veneer blocks, and an adhesive applied between the plurality of veneer blocks and the air barrier.

7 Claims, 19 Drawing Sheets

(51) Int. Cl.
*C04B 28/02* (2006.01)
*E04F 13/14* (2006.01)
*C04B 30/00* (2006.01)
*C04B 14/06* (2006.01)
*C04B 18/02* (2006.01)
C04B 111/40 (2006.01)
C04B 111/00 (2006.01)

(52) U.S. Cl.
CPC .............. *C04B 28/02* (2013.01); *C04B 30/00* (2013.01); *E04F 13/14* (2013.01); *E04F 13/141* (2013.01); *C04B 2111/00051* (2013.01); *C04B 2111/40* (2013.01)

(58) Field of Classification Search
CPC .. E04F 13/0862; E04F 13/0885; C04B 14/06; C04B 2111/40
See application file for complete search history.

(56) References Cited

U.S. PATENT DOCUMENTS

| | | | |
|---|---|---|---|
| 4,700,527 A | 10/1987 | Pardo | |
| 7,743,569 B1 | 6/2010 | Schwalenberg | |
| 2003/0188497 A1* | 10/2003 | Price | E02D 27/01 52/169.12 |
| 2004/0006945 A1* | 1/2004 | Price | E04B 2/06 52/605 |
| 2007/0137128 A1* | 6/2007 | Viau | B44C 5/0415 52/388 |
| 2007/0163203 A1 | 7/2007 | Price | |
| 2007/0175150 A1* | 8/2007 | Price | E02D 27/01 52/483.1 |
| 2007/0175159 A1 | 8/2007 | Miniter | |
| 2007/0216058 A1 | 9/2007 | Carreras-Maldonado et al. | |
| 2007/0289247 A1* | 12/2007 | Hamel | B28B 7/007 52/596 |
| 2007/0292216 A1 | 12/2007 | Hamel | |
| 2008/0145148 A1* | 6/2008 | Hamel | E01C 5/06 404/41 |
| 2008/0313988 A1 | 12/2008 | MacDonald | |
| 2010/0005740 A1* | 1/2010 | Lin | B28B 1/52 52/272 |
| 2010/0107531 A1* | 5/2010 | Hunsaker | E04F 13/0862 52/314 |
| 2010/0325993 A1 | 12/2010 | Bolin | |
| 2011/0154764 A1* | 6/2011 | Wang | C04B 28/02 52/309.1 |
| 2011/0173902 A1* | 7/2011 | Hohmann, Jr. | E04B 1/4178 52/167.1 |
| 2012/0006232 A1 | 1/2012 | Scanlan | |
| 2012/0256340 A1 | 10/2012 | Barger | |
| 2012/0272598 A1 | 11/2012 | Wilkie et al. | |
| 2013/0145968 A1* | 6/2013 | Scanlan | C04B 32/00 106/676 |
| 2014/0042668 A1 | 2/2014 | Bennett | |
| 2014/0069050 A1* | 3/2014 | Bolin | E04C 2/26 52/745.21 |
| 2014/0083040 A1* | 3/2014 | Taylor, Jr. | E04C 2/04 52/513 |
| 2014/0260034 A1* | 9/2014 | Ciuperca | E04C 2/296 52/405.3 |

OTHER PUBLICATIONS

Extended European Search Report for European Patent Application No. 16814836.9 dated May 29, 2019, 9 pages.

\* cited by examiner

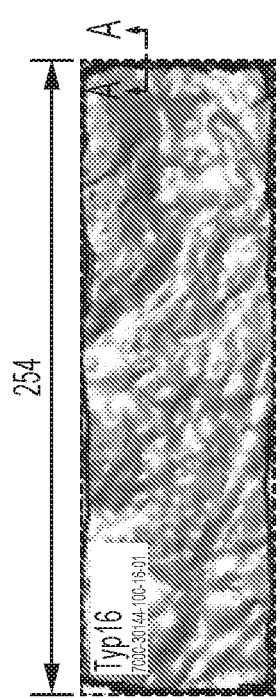
FIG. 8A
FIG. 8B
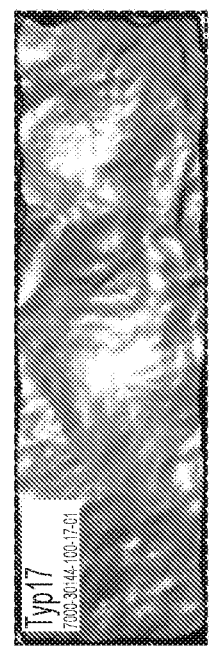
FIG. 8C
FIG. 8D
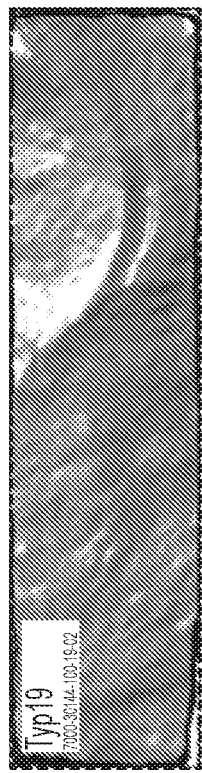
FIG. 8E

DRY-CAST LIGHTWEIGHT VENEER BLOCK, SYSTEM, AND METHOD

CROSS REFERENCE TO RELATED APPLICATIONS

This application is a National Stage Patent Application of PCT/US2016/015798, filed on Jan. 29, 2016, which claims priority benefits from U.S. Provisional Application Ser. No. 62/185,395 ("the '395 application"), filed on Jun. 26, 2015 and which applications are incorporated herein by reference. A claim of priority is made to each of the above disclosed applications.

FIELD OF THE INVENTION

This invention relates to dry-cast lightweight veneer products that are intended to adhere to other load bearing surfaces.

BACKGROUND

Wet-cast lightweight veneer products have been known in the industry for some time, and are intended to resemble natural stone and other masonry materials in size, shape, and texture. Typically, the wet-cast lightweight veneer products are wet-cast into handcrafted latex molds using a wet mixture of cement, supplementary cementitious materials, lightweight aggregates, chemical admixtures, and mineral oxide color pigments. The lightweight veneer products are used as an adhered, non-load-bearing exterior veneer or interior wall finish. The units are designed for vertical applications and can be installed on any properly prepared substrate such as concrete, masonry, drywall, or plywood.

To ensure quality, the wet-cast lightweight veneer products must comply with ASTM C1670. For example, according to ASTM C1670/C1670M—15 (Sep. 1, 2015 ed.) 8.3.2, the weight per square foot of the unit shall be determined by multiplying the saturated density of the unit by the average thickness, and shall not exceed 15 lb/ft$^2$. ASTM C1670/C1670M—15 (Sep. 1, 2015 ed.) 8.3.1 further provides a formula for calculating the saturated density, in which the saturated weight of a specimen is divided by the difference in the saturated weight and the immersed weight of the specimen. As a result, a higher absorption rate of the lightweight materials can negatively impact the ability of the product to meet the lightweight veneer requirements.

The lightweight aggregate used must meet the requirements of ASTM C330 or C331. Expanded shale, clay, and slate ("ESCS") typically meet these requirements and is usually the aggregate that is used in the mixture. The wet-cast lightweight veneer products are structurally strong, physically stable, durable, environmentally inert, and light in weight.

To apply the coloring to the wet mixture, typically the latex mold is lined with pigment and the mixture is introduced into the latex mold. Once the product dries and hardens, the latex mold is removed, and the pigment is then embedded into the surface of the wet-cast lightweight veneer product.

Because the pigmentation is only a surface treatment, any chips or damage to the wet-cast lightweight veneer products means that the unpigmented inner portions are visible, resulting in a less than visibly pleasing appearance. Furthermore, the use of surface pigmentation means that the wet-cast lightweight veneer products cannot be acid washed, as the acid wash removes the surface pigmentation, also exposing the unpigmented inner portions of the wet-cast lightweight veneer products. The use of surface pigmentation also means that the stone veneer cannot be cut to fit a space because the exposed unpigmented concrete edge will show.

In addition, because the wet-cast lightweight veneer products require the use of a latex (or other flexible) molds for removal after hardening, the flexible nature of the mold results in some variation in shape among the various units. For example, when applying the product, each course must be leveled with mortar applied in between courses as a buffer to absorb the variations among units.

Furthermore, such lightweight veneer products are conventionally installed using a multi-step system, as illustrated in FIG. 1. In this system, a weep screed is first attached to the bottom part of an exterior sheathing. Flashing is then applied over the sheathing, overlapping the vertical portion of the weep screed. Typically, weather resistive barrier ("WRB") is applied in two separate layers starting at the bottom of the wall (overlapping the weep screed) and working upward, using staples to attach them to the wall. The WRB overlaps horizontally 2" to 4" and vertically a minimum of 6" in shingle fashion. A metal lath is then applied over the WRB layers in horizontal fashion and overlapping 1" to 2" at both the horizontal and vertical seams. Using a trowel, mortar is spread over the entire lath, approximately ½" to ¾" thick so that no lath material is visible. Once the mortar is thumbprint hard, a stiff bristle brush or scratch rake can be used in horizontal motion to create a rough surface. After scratching the mortar, the scratch coat cures for 24-48 hours before installing veneer blocks. To apply the veneer blocks, mortar is applied to the entire back surface of the veneer block to ensure adhesion to the scratch coat. The block is pressed firmly onto the scratch coat and slid back and forth slightly until mortar squeezes out around the perimeter of the stone. This process is time-consuming and requires a skilled mason's expertise.

In certain embodiments, it may be desirable to produce a lightweight veneer product in which the pigmentation may be mixed throughout, and can be produced using a process that would result in more precise dimensions. It may also be desirable to streamline the installation process for veneer blocks of all types in a way that would reduce the number of steps, reduce the time required, and/or reduce the skill level needed so that a larger labor pool may be used to install veneer blocks in a shorter period of time.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Certain embodiments of the present invention comprise a dry cast lightweight veneer block. In some embodiments, pigmentation is dispersed throughout the dry cast lightweight veneer block. In certain embodiments, a weight of the dry cast lightweight veneer block is less than or equal to 15 lb/ft$^2$. The protocol for measuring this value is described in ASTM C1670/C1670M.

The dry cast lightweight veneer block may be formed from a dry cast mixture comprising approximately 35-45% by weight lightweight aggregate. The dry cast mixture may further comprise approximately 25-35% by weight fine sand. In some embodiments, the dry cast lightweight veneer is formed in a steel mold.

Certain embodiments of the present invention comprise assembly of dry cast lightweight veneer blocks, wherein courses of the dry cast lightweight veneer blocks are assembled without mortar between the courses. In some embodiments, sides of the dry cast lightweight veneer blocks comprise areas that recede from an imaginary plane between adjacent dry cast lightweight veneer blocks.

According to certain embodiments of the present invention, an installation system comprises a substrate, an air barrier applied to the substrate, a plurality of lightweight veneer blocks, and an adhesive located between the plurality of lightweight veneer blocks and the air barrier.

In some embodiments, the air barrier has an adhesion value of at least 16 psi. The substrate may be wood, plywood, exterior sheathing, oriented strand board, drywall, chipboard, hardboard, cement board, concrete, blockwork, and fiber cement siding. In certain embodiments, a shear strength of the bond between the plurality of lightweight veneer blocks and the air barrier is approximately 4000-5000 lb/ft$^2$.

In some embodiments, the plurality of lightweight veneer blocks are dry cast lightweight veneer blocks and/or each have a weight of less than or equal to 15 lb/ft$^2$.

According to certain embodiments of the present invention, a method of installing a plurality of lightweight veneer blocks on a substrate comprises applying an air barrier to the substrate, applying an adhesive to the air barrier, and installing the plurality of lightweight veneer blocks in courses by pressing the plurality of lightweight veneer blocks against the adhesive. According to some embodiments, the method may comprise applying an adhesive to the substrate, and installing the plurality of lightweight veneer blocks in courses by pressing the plurality of lightweight veneer blocks against the adhesive.

In some embodiments, applying the adhesive to the air barrier may comprise applying the adhesive in beads positioned approximately 3-4 inches apart. Applying the air barrier to the substrate may comprise rolling or spraying a liquid air barrier onto the substrate.

According to some embodiments, the method is performed at an installation rate of 45-50 ft$^2$/hr.

In some embodiments, the air barrier has an adhesion value of at least 16 psi. The substrate may be wood, plywood, exterior sheathing, oriented strand board, drywall, chipboard, hardboard, cement board, concrete, blockwork, and fiber cement siding. In certain embodiments, a shear strength of the bond between the plurality of lightweight veneer blocks and the air barrier is approximately 4000-5000 lb/ft$^2$.

In some embodiments, the plurality of lightweight veneer blocks are dry cast lightweight veneer blocks and/or each have a weight of less than or equal to 15 lb/ft$^2$.

BRIEF DESCRIPTION OF THE DRAWINGS

In the following detailed description, embodiments of the invention are described referring to the following figures:

FIGS. 8A-8E are views of mold walls that form the deep shadowing side texturing of DCLV blocks, according to certain embodiments of the present invention.

DETAILED DESCRIPTION

Figure 1:
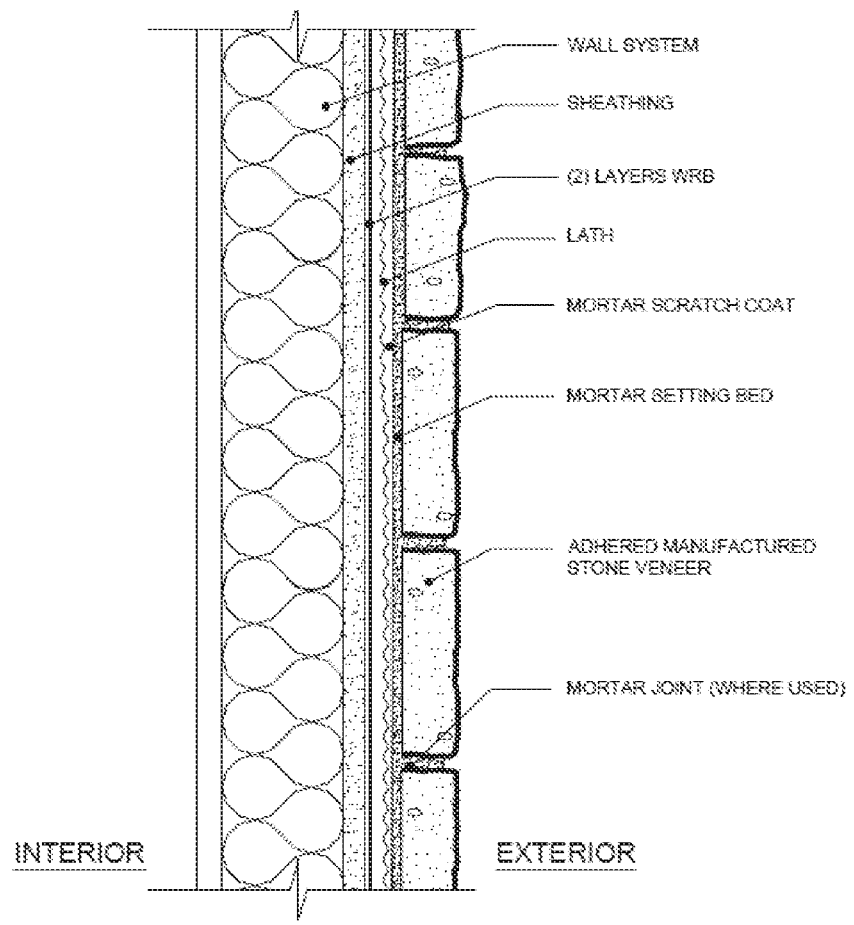
FIG. 1 is a side cross-sectional view of a conventional veneer block installation system with mortar joint spacing visible.
Figure 2:
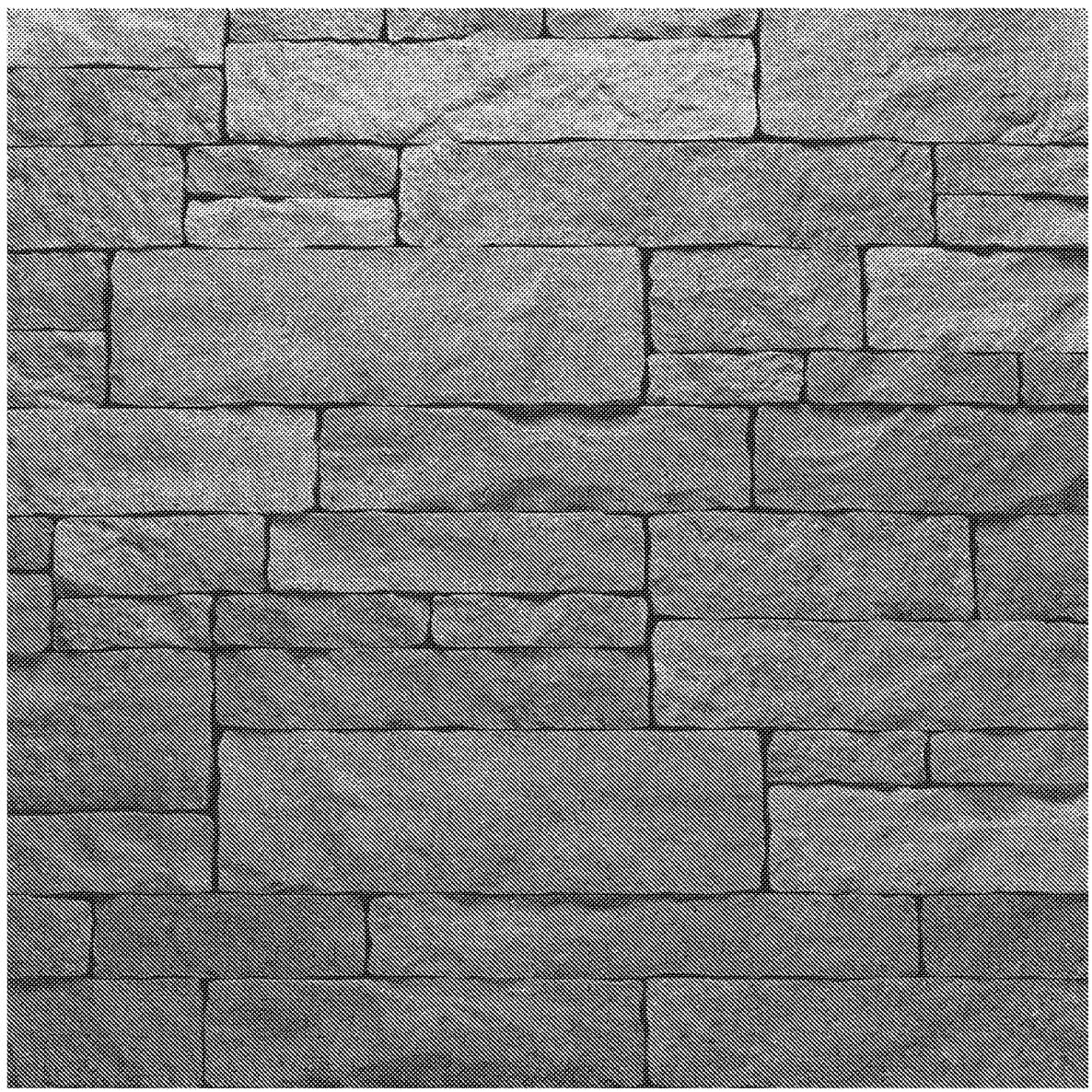
FIG. 2 is an image of an installed wall of dry-cast lightweight veneer blocks ("DCLV blocks") with no mortar joints, according to certain embodiments of the present invention.
Figure 3:
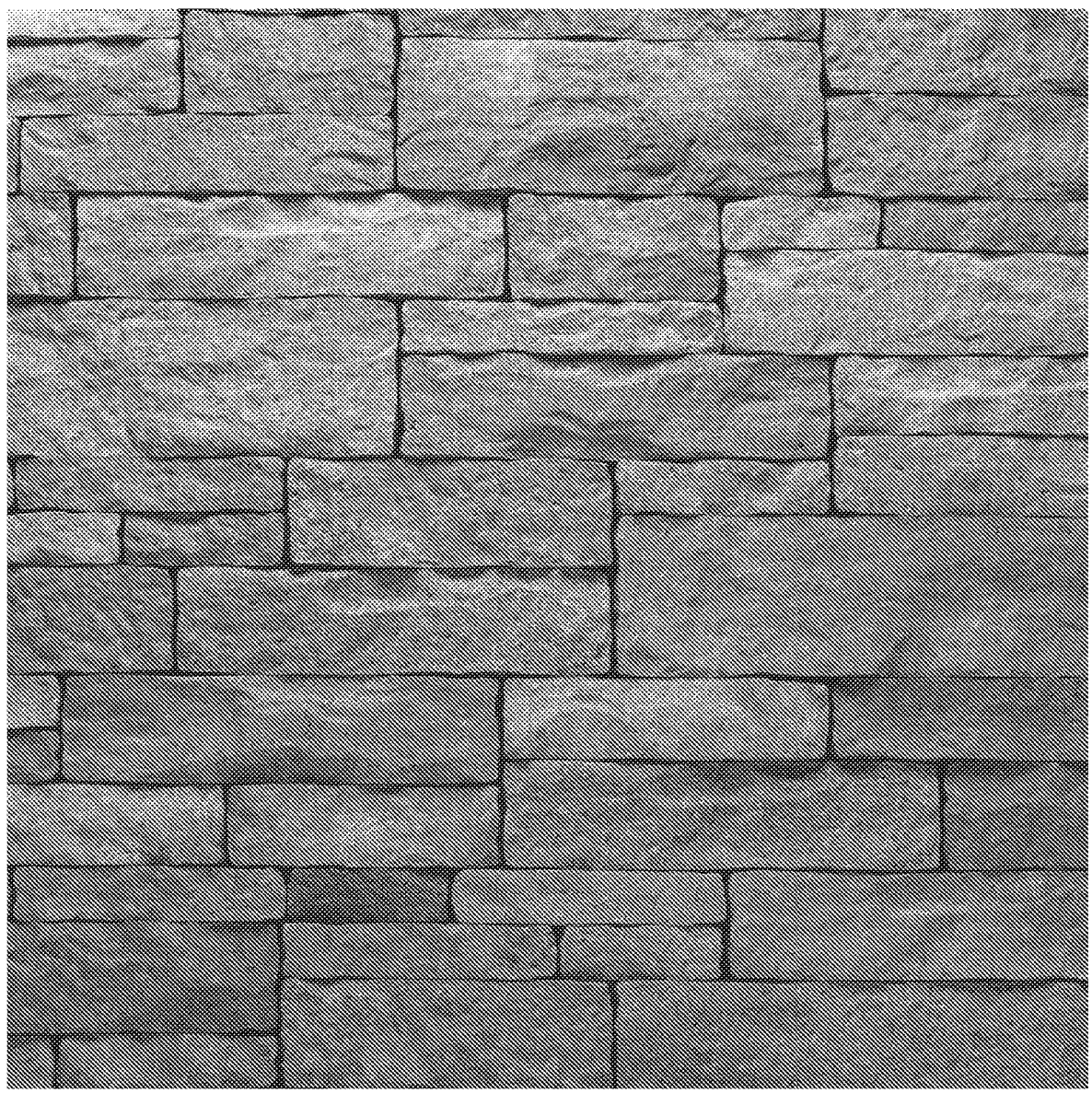
FIG. 3 is an image of an installed wall of DCLV blocks, according to certain embodiments of the present invention.
Figure 4:
FIG. 4 is an image of an installed wall of DCLV blocks, according to certain embodiments of the present invention.
Figure 5:
FIG. 5 is an image of a chimney formed with DCLV blocks, according to certain embodiments of the present invention.
Figure 6:
FIG. 6 is another image of the chimney of FIG. 5.
Figure 7:
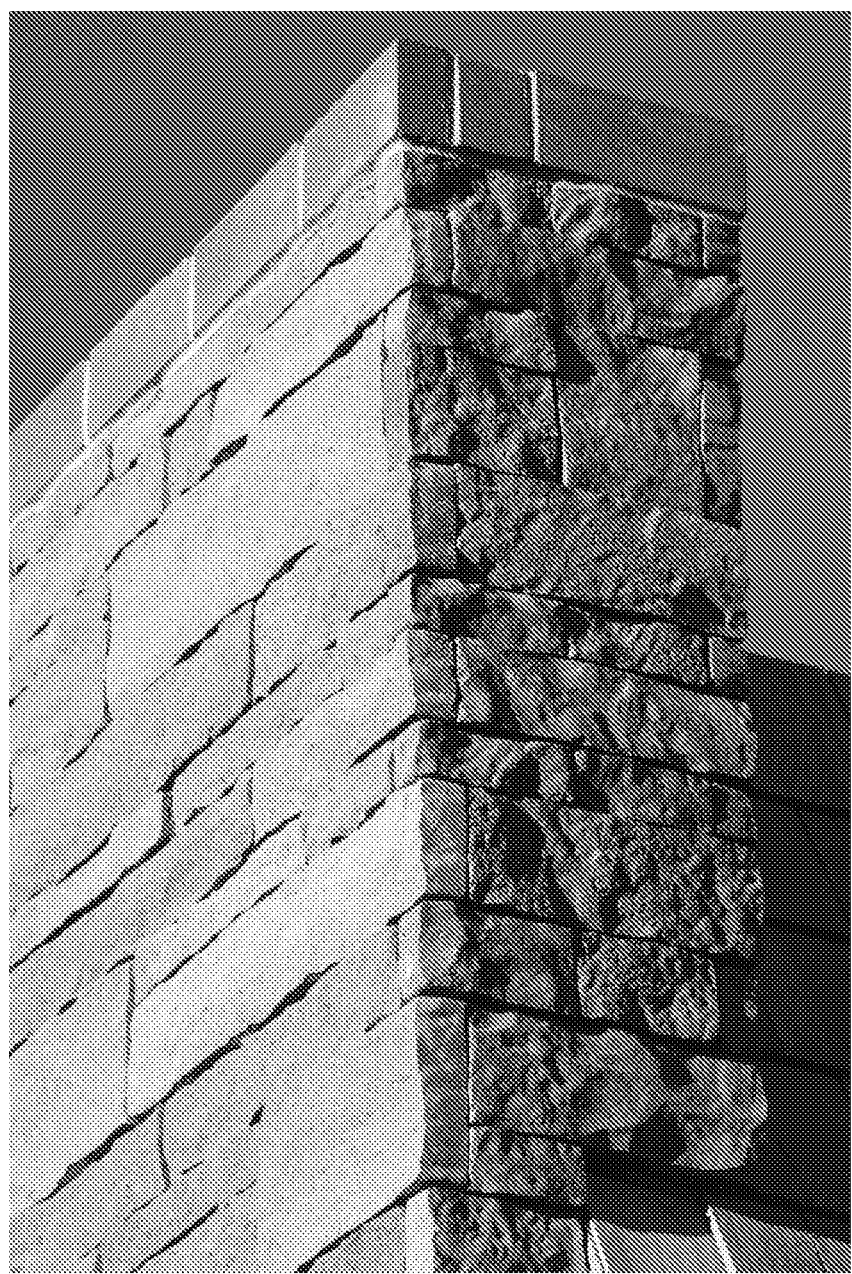
FIG. 7 is another image of the chimney of FIG. 5.
Figure 9:
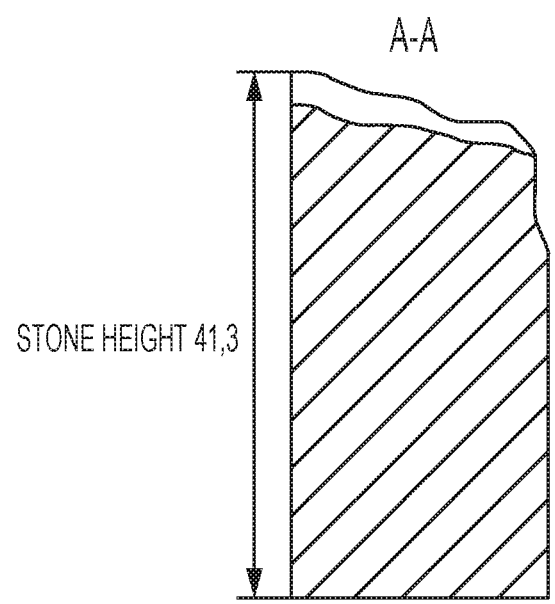
FIG. 9 is a cross-sectional view of a mold that forms the deep shadowing side texturing of DCLV blocks, according to certain embodiments of the present invention.
Figure 10:
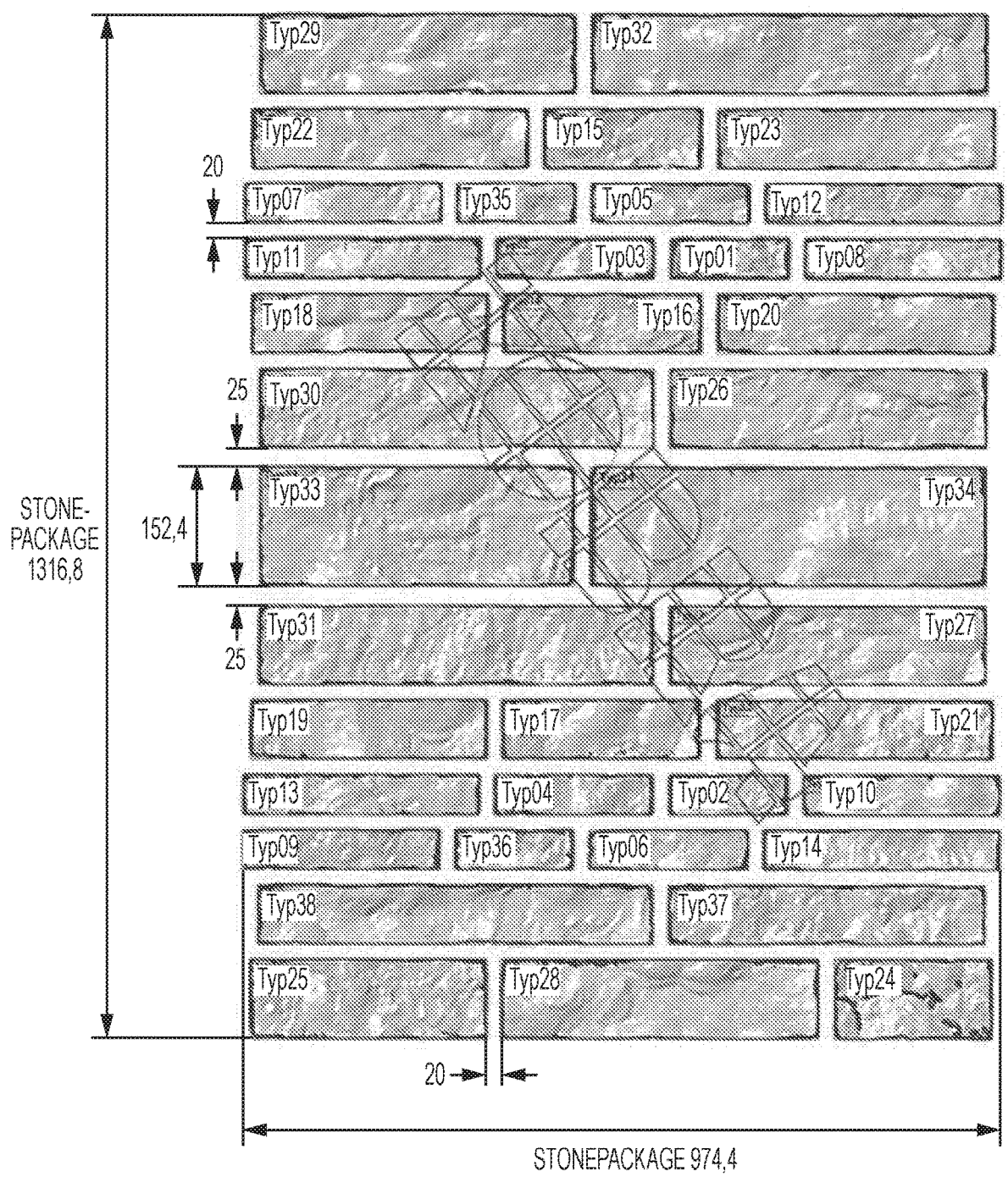
FIG. 10 is a front view of a mold that forms a layout of DCLV blocks with deep shadowing side texturing, according to certain embodiments of the present invention.
Figure 11:
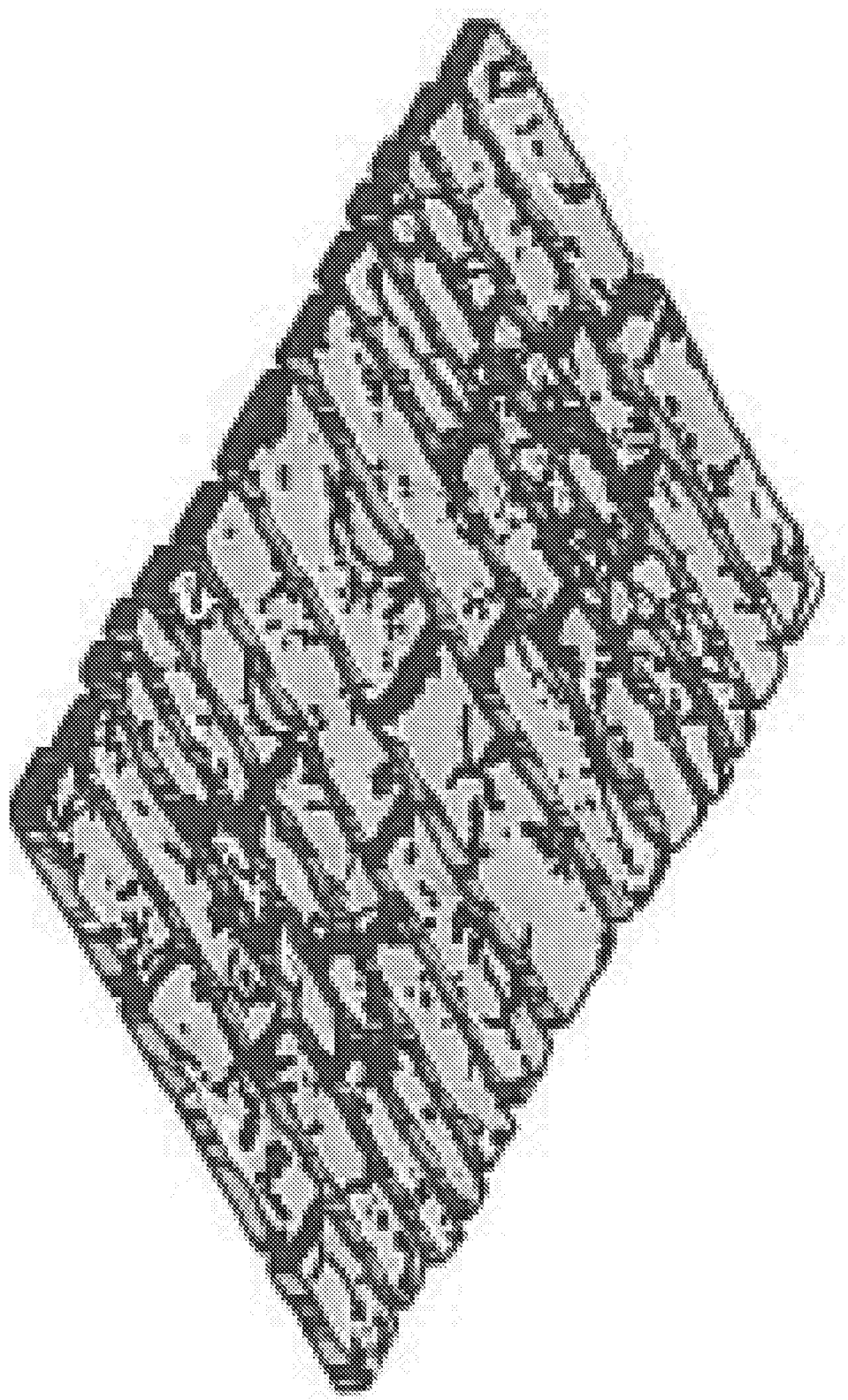
FIG. 11 is a perspective view of the mold of FIG. 10.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Dry-Cast Lightweight Veneer Mix Design

The dry-cast lightweight veneer blocks ("DCLV blocks") described below and in the claims of this patent may be construction materials manufactured of any suitable dry cast materials, including but not limited to cement, sand, and aggregates. In some cases, additional and/or alternative ingredients may be used, which may include but are not limited to other masonry products, structural foams, plastics, plastic composites, reinforced plastics, filled plastics, and polymer materials. In certain embodiments, the mixture used to form the DCLV blocks may comprise course sand, fine sand, and lightweight aggregate. FIGS. 2-7 are images of certain embodiments of DCLV blocks installed in walls and chimneys.

It will be understood that the term "fine sand" generally refers to sand in which the majority of particles have a particle size less than 600 μm, and more specifically refers to sand in which over 70% of particles have a particle size in a range of 300 μm-600 μm. Examples of fine sand include but are not limited to silica sand.

It will also be understood that the term "coarse sand" generally refers to sand in which the majority of particles have a particle size greater than 300 μm, and more specifically refers to sand in which over 60% of particles have a particle size in a range of 300 μm-2 mm. Examples of coarse sand include but are not limited to FA2 sand.

The lightweight aggregate may include but is not limited to gravelite, expanded shale, pumice, slag aggregate, etc.

A Fineness modulus ("FM") is an empirical figure defined mathematically as the sum of the cumulative percentages retained on standard sieves divided by 100. Standard size sieves are ⅜ in (9.5 mm), No. 4 (4.75 mm), No. 8 (2.36 mm), No. 16 (1.18 mm), No. 30 (600 μm), No. 50 (300 μm), and No. 100 (150 μm). FM is an index of the fineness of an aggregate, the higher the FM, the coarser the aggregate. In certain embodiments, fine sand may have a FM of less than 2, and course sand may have a FM of greater than 2. However, these are merely ranges for certain embodiments, and other values outside these ranges may be included in both categories.

The ratio of lightweight aggregate to the course and fine sand matrix results in a density of 105 lb/ft$^3$ or less, whereas traditional dry cast products have a density of approximately 140-141 lb/ft$^3$. The greater density associated with dry-cast products has traditionally made it very difficult to use dry-casting as a way to produce lightweight veneers, particularly since ASTM standards limit the maximum weight of veneers to 15 lb/ft$^2$, a value easily attained with wet cast products due to the predominance of lightweight aggregates.

For comparison, a DCLV block of 1⅝ in (nominal) thickness has overall dimensions of 1⅝ in×12 in×12 in (or 235.275 in$^3$ or 0.136 ft$^3$). A maximum density of the DCLV block at 15 lb/ft$^2$ is 110.17 lb/ft$^3$. Table I below show the correlation between other densities for a DCLV block of these dimensions.

TABLE I

Correlation between other Densities for a DCLV Block.

| | |
|---|---|
| 105 lb/ft$^3$ | 14.296 lb/ft$^2$ |
| 103 lb/ft$^3$ | 14.024 lb/ft$^2$ |

TABLE I-continued

Correlation between other Densities for a DCLV Block.

| | |
|---|---|
| 101 lb/ft$^3$ | 13.752 lb/ft$^2$ |
| 99 lb/ft$^3$ | 13.479 lb/ft$^2$ |

When lightweight aggregate was initially introduced into the dry cast mixture during early testing, the lightweight aggregate tended to disperse to the surface of the DCLV blocks, giving it an undesirable "popcorn ceiling" appearance. To temper that look, the ratios of various gradations of sand were evaluated to determine how to prevent the migration of the lightweight aggregate to the surface, while also keeping the weight from exceeding the threshold amount. To achieve the desired balance of the conflicting properties, fine sand may be added to the aggregate in a range of 25%-35% by weight, depending on graduations of the other aggregates, to provide a tight texture. The lightweight aggregate may be added in a range of 35%-45% by weight, depending on graduations and weight of the other aggregates, and may be added to ensure that the blend has a maximum weight of 15 lb/ft$^2$. The protocol for measuring this value is described in ASTM C1670/C1670M. In some embodiments, the amount of lightweight aggregate may be as low as 30% by weight. Coarse sand may be added as a filler in any suitable range that provides the appropriate weight and properties. The mixture of both fine and coarse sand allows the dry-cast product to achieve the necessary weight below the ASTM maximum threshold value of 15 lb/ft$^2$, while also allowing the mixture to have a smooth surface appearance.

In certain embodiments, color pigmentation is added directly with the other ingredients to form the mixture, rather than adding it to the surface of a mold. As a result, the coloration extends through the entire DCLV block, and chipping or damaging the surface of the DCLV block does not reveal any unpigmented inner portions.

Likewise, the surface of the DCLV block can be cleaned like any standard masonry without concern that such treatment will remove surface pigmentation and expose unpigmented inner portions below.

To prepare the DCLV blocks, the mixture is prepared and introduced into a steel mold. Pressure is then applied to the mixture with a shoe so that the mixture hardens into the DCLV blocks. By forming the mold from steel (or other suitably rigid material), the DCLV blocks can be made with a high level of precision, otherwise not possible with latex molds, urethane molds, or other flexible molds. The use of steel or otherwise rigid molds is not possible with wet cast concrete because there is no way to remove the wet cast product from the mold after it has dried and hardened.

EXAMPLES

32% by weight (1415 lb) silica sand, 27% by weight (1195 lb) FA2 sand, and 41% by weight (1810 lb) lightweight aggregate (gravelite) were combined form a lightweight aggregate blend. The resulting particle size distribution is summarized in Table II below.

TABLE II

Distribution in Particle Size within Each Component.

| Sieve Size | Silica Sand | | | FA2 Sand | | | Gravelite | | |
|---|---|---|---|---|---|---|---|---|---|
| | Grams Ret. | % Ret. | % Accum | Grams Ret. | % Ret. | % Accum | Grams Ret. | % Ret. | % Accum |
| 3/8" (9.5 mm) | 0.0 | 0.0% | 0.0% | 0.0 | 0.0% | 0.0% | 0.0 | 0.0% | 0.0% |
| #4 (4.75 mm) | 0.0 | 0.0% | 0.0% | 1.6 | 0.2% | 0.2% | 25.2 | 7.6% | 7.6% |
| #8 (2.36 mm) | 0.0 | 0.0% | 0.0% | 63.7 | 8.2% | 8.4% | 90.6 | 27.4% | 35.1% |
| #16 (1.18 mm) | 0.0 | 0.0% | 0.0% | 109.2 | 14.1% | 22.5% | 88.3 | 26.7% | 61.8% |
| #30 (600 μm) | 8.6 | 1.0% | 1.0% | 191.8 | 24.8% | 47.3% | 55.6 | 16.8% | 78.7% |
| #50 (300 μm) | 656.0 | 76.7% | 77.7% | 168.8 | 21.8% | 69.1% | 30.8 | 9.3% | 88.0% |
| #100 (150 μm) | 183.8 | 21.5% | 99.2% | 219.2 | 28.3% | 97.4% | 14.3 | 4.3% | 92.3% |
| Pan | 6.5 | 0.8% | 100.0% | 20.3 | 2.6% | 100.0% | 25.3 | 7.7% | 100.0% |
| Total | 854.9 | FM = | 1.78 | 774.6 | FM = | 2.45 | 330.1 | FM = | 3.64 |

A Hillcrest dry cast lightweight veneer product, which is also shown in FIGS. 2-7, was prepared according to the aggregate mixture. The Hillcrest product and a wet cast lightweight veneer product (known as Eldorado Limestone) were comparatively tested for compressive strength, density, and absorption, according to AC51, ASTM C170, and ASTM C140. The compression of the Hillcrest product could not be tested in accordance with ASTM C190, which is a wet cast standard. Also, the cylinder samples are smaller than required by ASTM C170 due to the stone thickness. AC51 requires 1800 psi minimum with a 10% maximum variation, 22% maximum water absorption (for stones <85 lb/ft³), and 15% maximum water absorption (for stones <125 lb/ft³). The test results for the Eldorado Limestone Wet Cast Lightweight Veneer are included in Table III below; and the test results for the Hillcrest Dry Cast Lightweight Veneer are included in Table IV below.

TABLE III

Test Results for Eldorado Limestone Wet Cast Lightweight Veneer.

| | | Compressive Strength | | Density | | Absorption |
|---|---|---|---|---|---|---|
| | | ASTM C170 | | ASTM C140 | | |
| | | MPa | PSI | Kg/m3 | Lb/ft3 | % |
| # sample | A | 27.8 | 4032 | 1262 | 78.78 | 19.6 |
| | B | 27.4 | 3974 | 1261 | 78.72 | 19.6 |
| | C | 33.7 | 4888 | 1261 | 78.72 | 18.6 |
| | D | 32.0 | 4641 | 1260 | 78.66 | 19.9 |
| | E | 31.6 | 4583 | 1256 | 78.41 | 19.6 |
| | F | 33.7 | 4888 | 1265 | 78.97 | 19.0 |
| | Average | 31.0 | 4501 | 1261 | 78.7 | 19.4 |
| | Min | 27.4 | 3974 | 1256 | 78.4 | 18.6 |
| | Max | 33.7 | 4888 | 1265 | 79.0 | 19.9 |
| | Std Dev | 2.6 | 370 | 2.7 | 0.2 | 0.4 |
| | Ecart min | 11.7% | | 0.4% | | 4.0% |
| | Ecart max | 8.6% | | 0.3% | | 2.7% |
| | Max var/avg | 12% | | 0.4% | | 4.0% |

TABLE IV

Test Results for Hillcrest Dry Cast Lightweight Veneer.

| | | Compressive Strength | | Density | | Absorption |
|---|---|---|---|---|---|---|
| | | ASTM C170 | | ASTM C140 | | |
| | | MPa | PSI | Kg/m3 | Lb/ft3 | % |
| # sample | 1 | 44.9 | 6512 | 1697 | 105.94 | 6.0 |
| | 2 | 34.4 | 4989 | 1656 | 103.38 | 6.0 |
| | 3 | 35.0 | 5076 | 1666 | 104.00 | 6.1 |
| | 4 | 44.1 | 6396 | 1664 | 103.88 | 5.8 |
| | 5 | 45.4 | 6584 | 1700 | 106.13 | 6.1 |
| | 6 | 45.7 | 6628 | 1691 | 105.57 | 5.6 |
| | 7 | 32.8 | 4757 | 1647 | 102.82 | 5.7 |
| | Average | 40.3 | 5849 | 1674 | 104.5 | 5.9 |
| | Min | 32.8 | 4757 | 1647 | 102.8 | 5.6 |
| | Max | 45.7 | 6628 | 1700 | 106.1 | 6.1 |
| | Std Dev | 5.5 | 794 | 19.7 | 1.2 | 0.2 |
| | Ecart min | 18.7% | | 1.6% | | 5.1% |
| | Ecart max | 13.3% | | 1.5% | | 3.4% |
| | Max var/avg | 19% | | 1.6% | | 5.1% |

In these test results, the variation in the Hillcrest Dry Cast Lightweight Veneer and the Eldorado Limestone Wet Cast Lightweight Veneer for compression tests is higher than required by AC51, but minimum results are still very high in comparison with the 1800 psi minimum. In fact, the dry cast veneer process generates products with 4-5 times higher psi than the wet cast process, which is particularly noticeable when compared to the AC51 standard, which sets a minimum limit for psi at only 1800 psi and which was developed based on wet cast veneer products.

The lower absorption rate/integral water repellent and higher psi values also act to minimize freeze/thaw damage to the DCLV block. To confirm, the aggregate mixture was tested for freeze-thaw, according to ASTM C666/C666M and NQ 2624-120. Veneer specimens were prepared using the aggregate mixture and tested with the NQ2624-120 standard (except that salt water was replaced with fresh water) and ASTM C666/C666M.

Each specimen's resistance to freezing and thawing was tested. According to the test protocol, the specimens must not break or disintegrate, and weight loss is limited to 3% of the original weight. Each specimen is prepared with a 4 inch square by a thickness of 1.63 inches, and subjected to 50 cycles of freezing and thawing, unless the specimen breaks or appears to have lost more the 1.5% of their original weight. Weight loss is determined as a percentage of the original weight of the dry specimens. The standard deviations of these tests are included in Table V below.

TABLE V

Standard Deviations of Tests Performed.

| | | NQ 2624-120 | ASTM C666/C666M |
|---|---|---|---|
| Cycle duration | 9.4.4.3 | Total cycle time 24 h Freezing 16 h +/− 1 h Thawing 8 h +/− 1 h | 5.2 Total cycle time 2 h < t < 5 h Thawing duration > 25% total cycle time (procedure A) Thawing duration > 20% total cycle time (procedure B) *Procedure A: rapid freezing and thawing in water Procedure B: rapid freezing in air and thawing in water |
| Temperature Immersing liquid | 9.4.2.1 9.4.2.6 | 5 to −15 deg C. Salted water * Replaced by fresh water | 5.2 4 to −18 deg C. Unsalted water |
| Weight loss measurement | 9.4.4 | 10-25-50 cycles | 8.3 Intervals not exceeding 36 cycles to reach 300 cycles |
| Means of measuring weight loss | 9.4.4 | Filtering and scaling particles left in the container | 8.3 Scaling the specimen itself |

Deep Texturing for DCLV Blocks

In certain embodiments, deep texturing may be included within mold surfaces, as best illustrated in FIGS. 8A-8E, 9, 10, and 11, so as to impart an improved look of natural stone to the DCLV blocks, including shadows and other effects. With such deep textures, many dry cast products may have a tendency to stick to the textured areas. Despite the presence of deep texturing in the mold, the DCLV block is typically easily removed from the mold without the need for heat. In certain embodiments, it may nevertheless be desirable to introduce heat with the mold to enhance removal of the DCLV blocks so that even greater texturing may be achieved. Furthermore, each dry cast cycle produces 9-11 square feet onto a board.

In certain embodiments, as shown in FIGS. 8A-8E, 9, 10, and 11, the mold may be configured to apply textures to the face and/or to the sides of the DCLV block. In the case of the sides, the textures are arranged so that the sides may have areas that recede from an imaginary plane with other areas that either align or contact the imaginary plane but do not exceed the imaginary plane. In some embodiments, the imaginary planes of each side may be arranged at approximately 90 degree angles from the imaginary plane of adjacent sides, thus forming a very precisely squared outer perimeter of each DCLV block that also has a look and feel of natural stone. In other embodiments, the imaginary planes may be arranged at any suitable angle to form other precise shapes, including but not limited to hexagons, rectangles, triangles, octagons, pentagons, or any other curved or straight polygonal shape, including but not limited to regular and irregular polygons.

By arranging the receded locations and the contact locations within a particular side of the DCLV block strategically, the contract portions of the DCLV are aligned with the imaginary planes and are positioned to contact the contact portions of a mating side of an adjacent DCLV block. Since these contact portions are arranged substantially parallel to the imaginary outer plane, the DCLV blocks may be installed in very straight and level courses that do not require mortar to be applied between courses to achieve a level application.

Installation System for Lightweight Veneer Products

According to certain embodiments of the present invention, a system for installing DCLV block or any other stone or brick veneer blocks that weighs 15 lb/ft$^2$ or less (collectively, referred to herein as "veneer block") comprises the use of an air barrier and an adhesive to attach the block to a substrate.

Examples of substrates may include but are not limited to wood, plywood, exterior sheathing, oriented strand board ("OSB"), drywall (also known as plasterboard, wallboard, gypsum board, Sheetrock, Gyproc, plasterboard), chipboard, hardboard, cement board, concrete, blockwork, and fiber cement siding.

In certain embodiments, the air barrier may be any substance used to stop unrestricted air infiltration and exfiltration through a building envelope, which adheres directly to the substrate such that greater than 16 psi of force is required to separate the air barrier from the substrate, as measured according to ASTM D4541. Examples of suitable air barriers that meet these parameters may include but are not limited to ExoAir® 230, which is a fluid-applied vapor-permeable air barrier membrane manufactured by Tremco illbruck.

In certain embodiments, the adhesive may be any substance that provides a high strength flexible bond between the block and the air barrier with a shear strength of approximately 4000-5000 lb/ft$^2$. The adhesive may be a blend of polymers (including but not limited to acrylic, latex, and urethane polymers) and adhesion promoters, which are compatible with the air barrier composition, and have good adhesion to a variety of construction surfaces including but not limited to brick, concrete, wood, plywood, exterior sheathing, OSB, drywall (also known as plasterboard, wallboard, gypsum board, Sheetrock, Gyproc, plasterboard), chipboard, hardboard, cement board, concrete, blockwork, and fiber cement siding. Furthermore, the adhesive may have an "instant grab" that minimizes the need for additional clamping or other mechanical supports, while still allowing some initial sliding of the block for placement during installation. In addition, the adhesive may have a shore A hardness of at least 50. The adhesive may further have a sufficiently high viscosity that prevents the adhesive from completely flattening when applied in vertical beads to the substrate so as to ensure that a drainage plane between the veneer block and the substrate remains open, as described in more detail below.

Examples of suitable adhesives that meet these parameters may include but are not limited to SP350, which is hybrid polymer sealant and adhesive based on Tremco illbruck's advanced SP hybrid polymer formulation. In other embodiments, the adhesive may be in the form of a tape applied to the cured surface of the air barrier.

Figure 12:
FIG. 12 is an image showing an application of an adhesive to a cured surface of an air barrier applied to a substrate, according to certain embodiments of the present invention.

In certain embodiments, to install the blocks, the substrate is first treated (or may be pre-treated) with the air barrier. FIG. 12 illustrates such a substrate, in this example OSB, which has been treated with a fluid air barrier. Treatment may include rolling or spraying the air barrier onto the substrate. Once the air barrier has completely cured, a starter wood stud may be fastened to the bottom of the substrate for alignment and to prevent the veneer blocks from sliding during installation, also as illustrated in FIG. 12. The adhesive is then applied in relatively small sections (around 3 ft$^2$) to the cured air barrier surface using beads of adhesive spaced approximately every 3-4 inches. In some embodiments, the adhesive may be applied directly to the substrate, such as in applications were an air barrier is not needed. The adhesive may be applied using a caulk gun, and may further be applied with a caulk gun having two applicators so that two beads of adhesive may be applied simultaneously.

Figure 13:
FIG. 13 is an image showing installation of a first course of veneer blocks to the substrate of FIG. 12.
Figure 14:
FIG. 14 is an image showing the drainage plane present between the veneer block and the substrate after installation of the veneer blocks to the substrate of FIG. 12.
Figure 15:
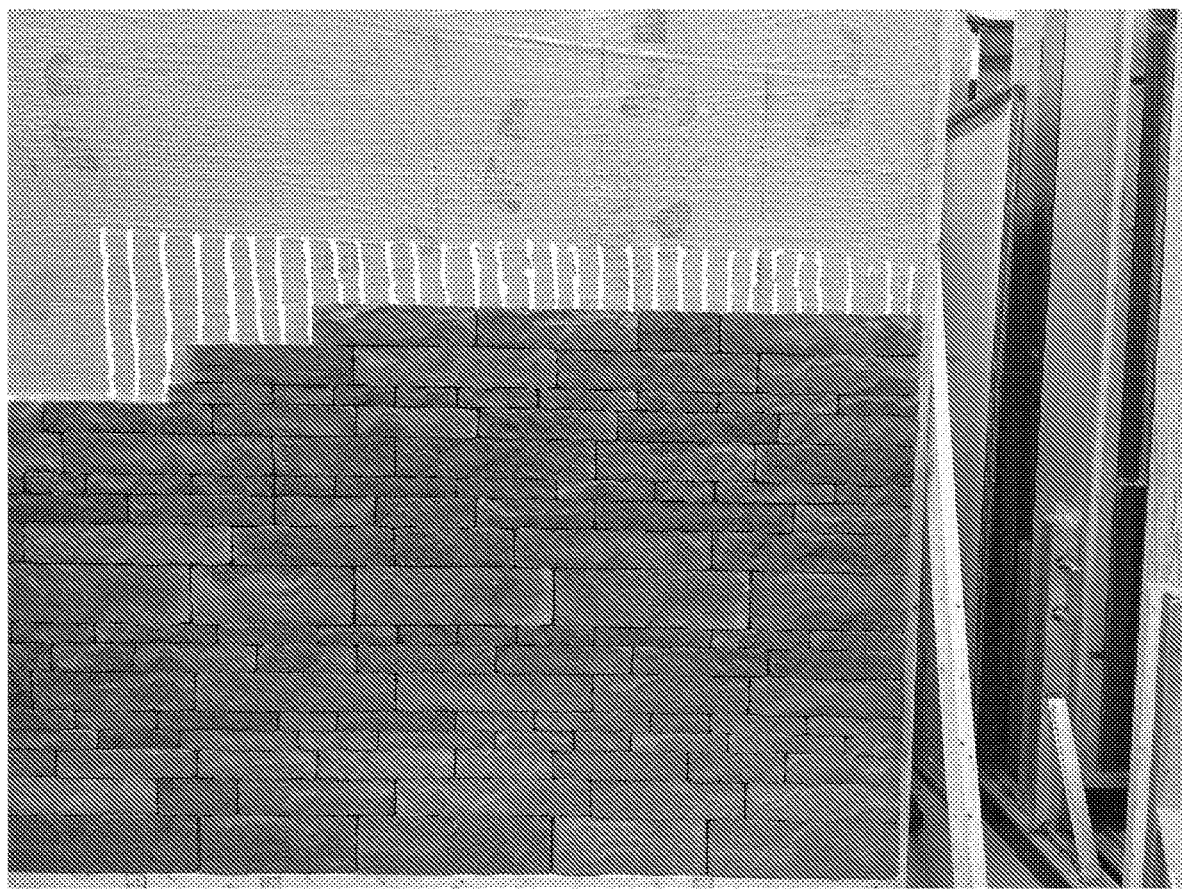
FIG. 15 is an image of the substrate of FIG. 12 after several courses of veneer blocks have been installed.
Figure 16:
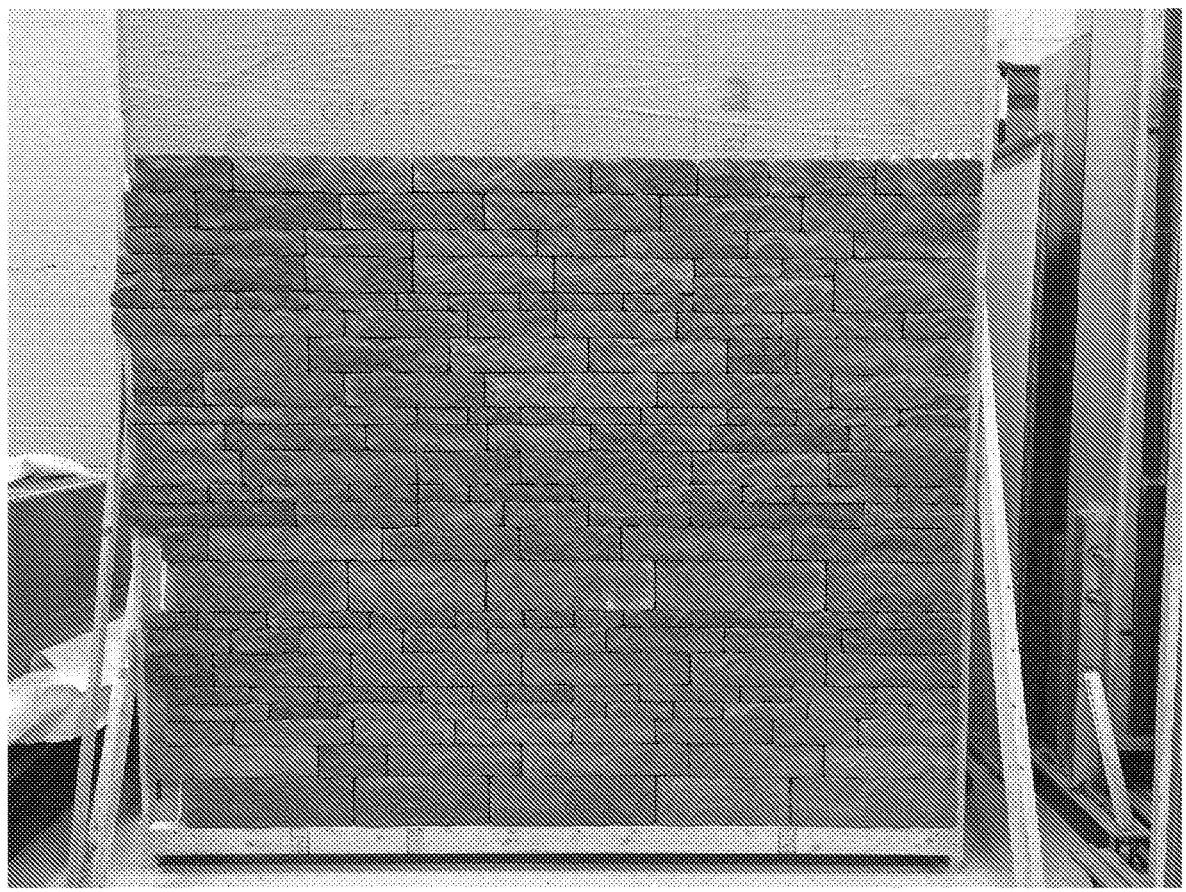
FIG. 16 is an image of the substrate of FIG. 12 after more courses of veneer blocks have been installed.
Figure 17:
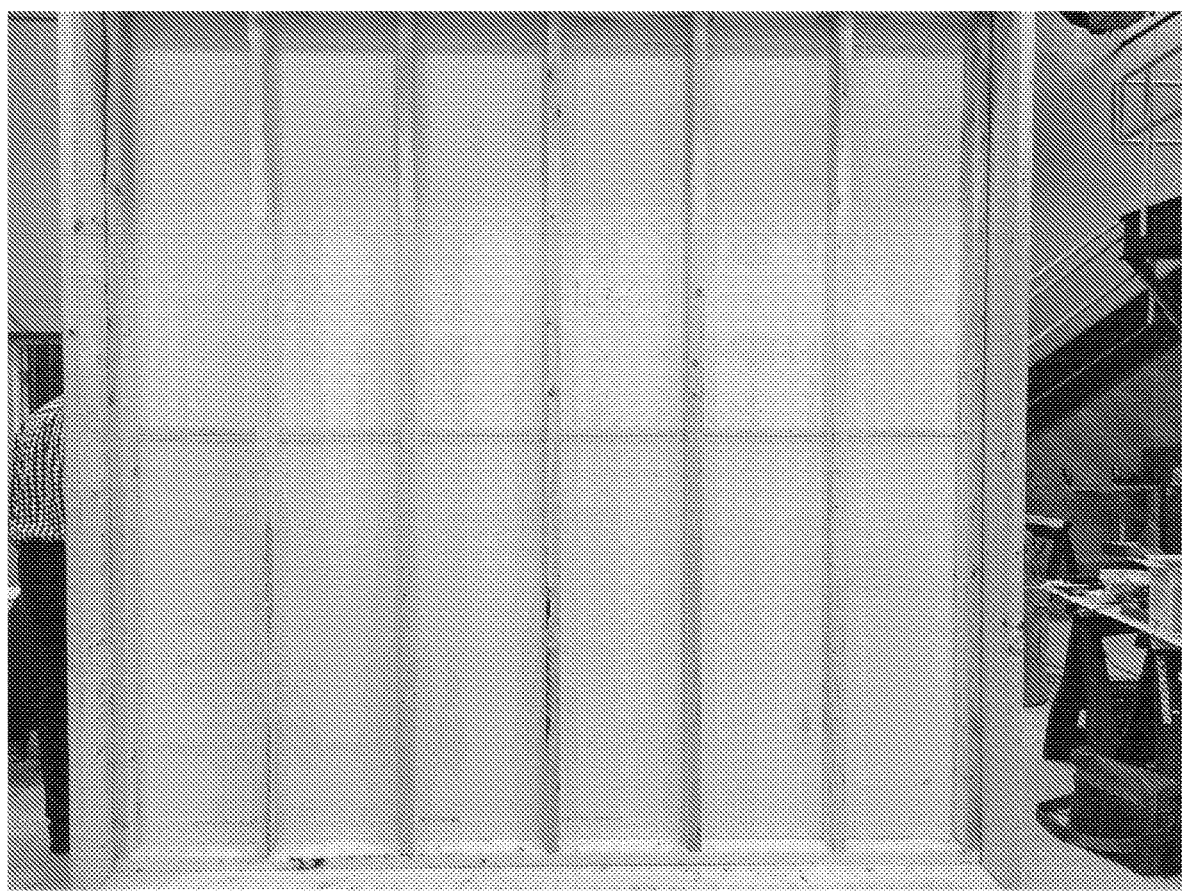
FIG. 17 is an image of the opposing side of the substrate of FIG. 12.
Figure 18A:
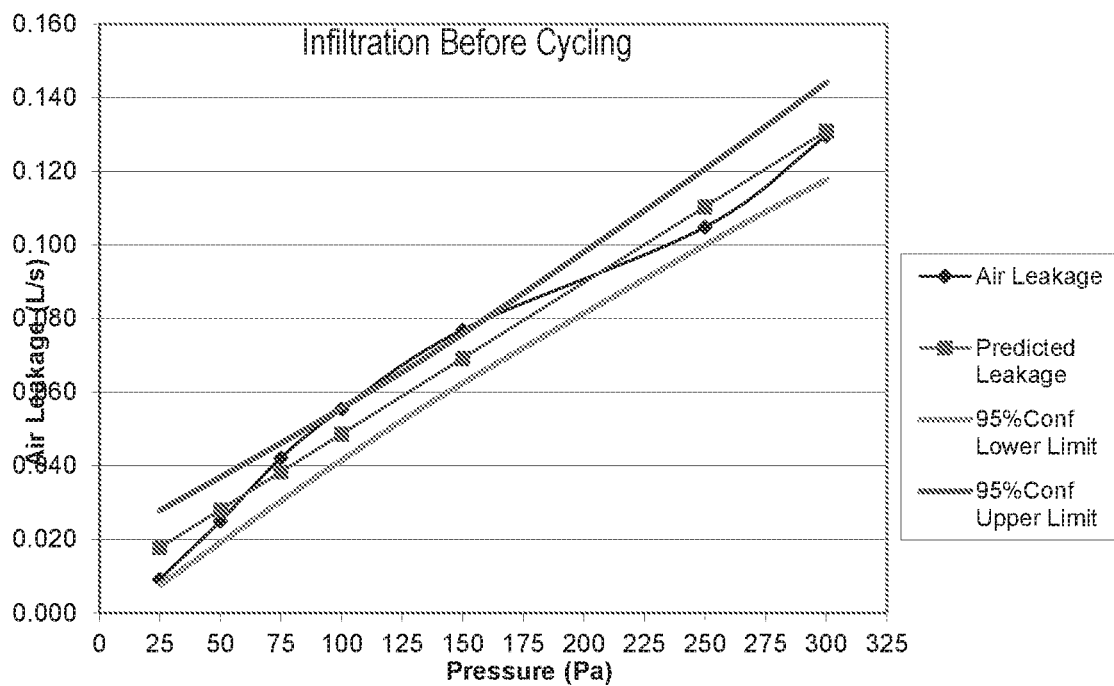
FIG. 18A is a graph of air leakage test results at infiltration before cycling for DCLV blocks installed with adhesive and air barrier on an OSB substrate, according to certain embodiments of the present invention.
Figure 18B:
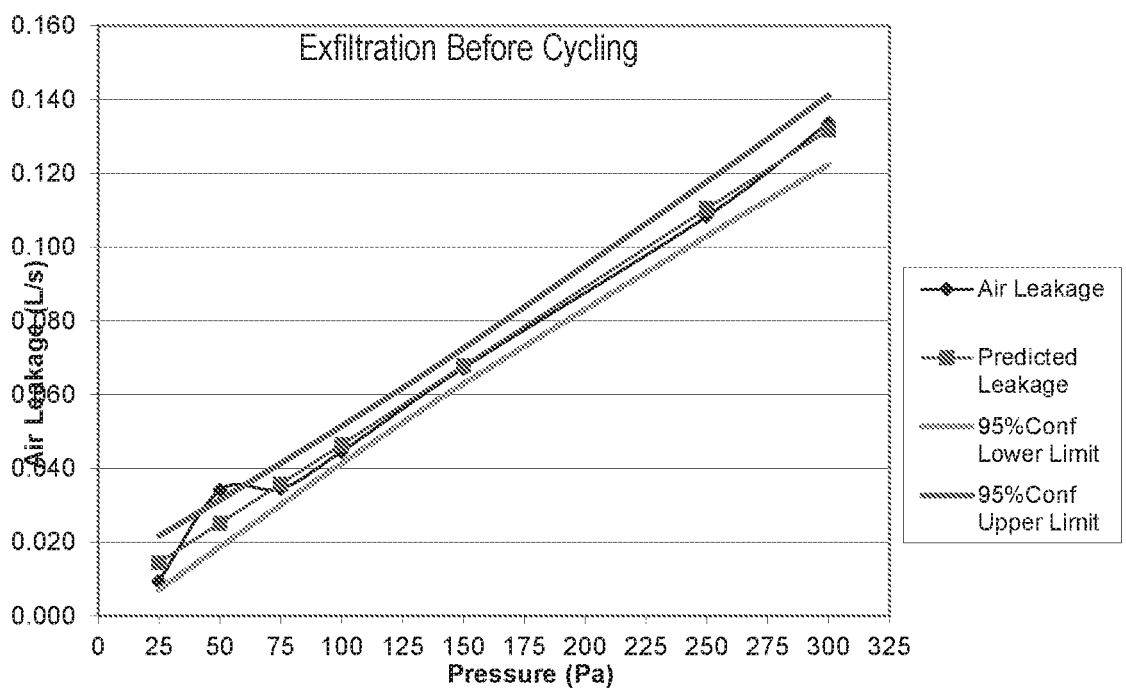
FIG. 18B is a graph of air leakage test results at exfiltration before cycling for DCLV blocks installed with adhesive and air barrier on an OSB substrate, according to certain embodiments of the present invention.
Figure 18C:
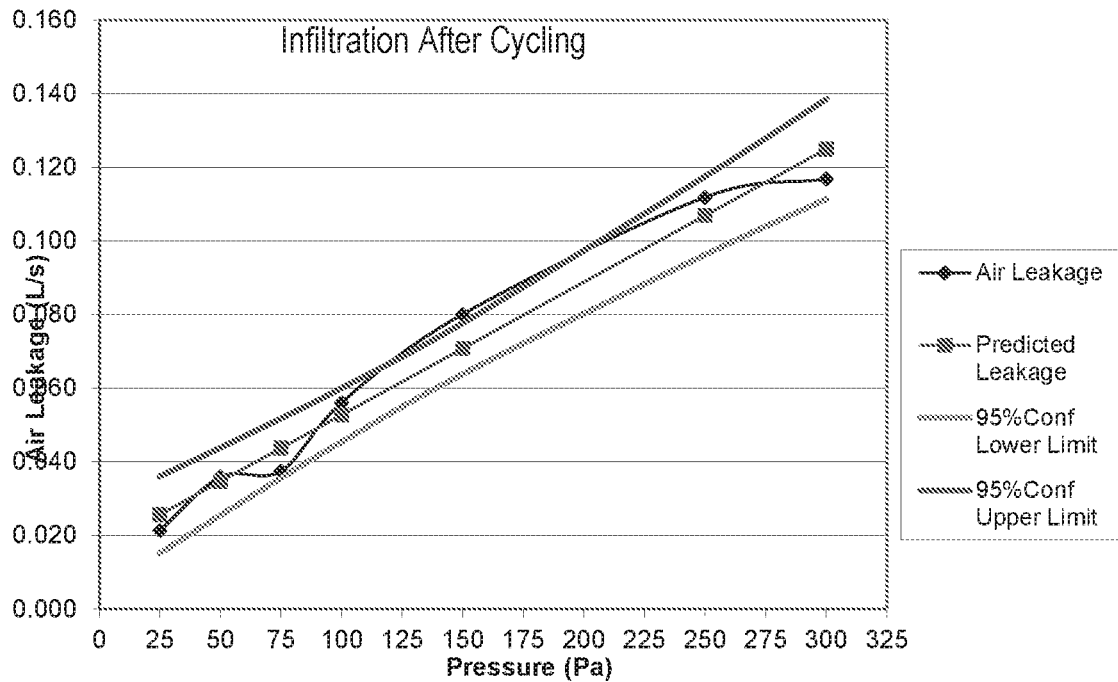
FIG. 18C is a graph of air leakage test results at infiltration after cycling for DCLV blocks installed with adhesive and air barrier on an OSB substrate, according to certain embodiments of the present invention.
Figure 18D:
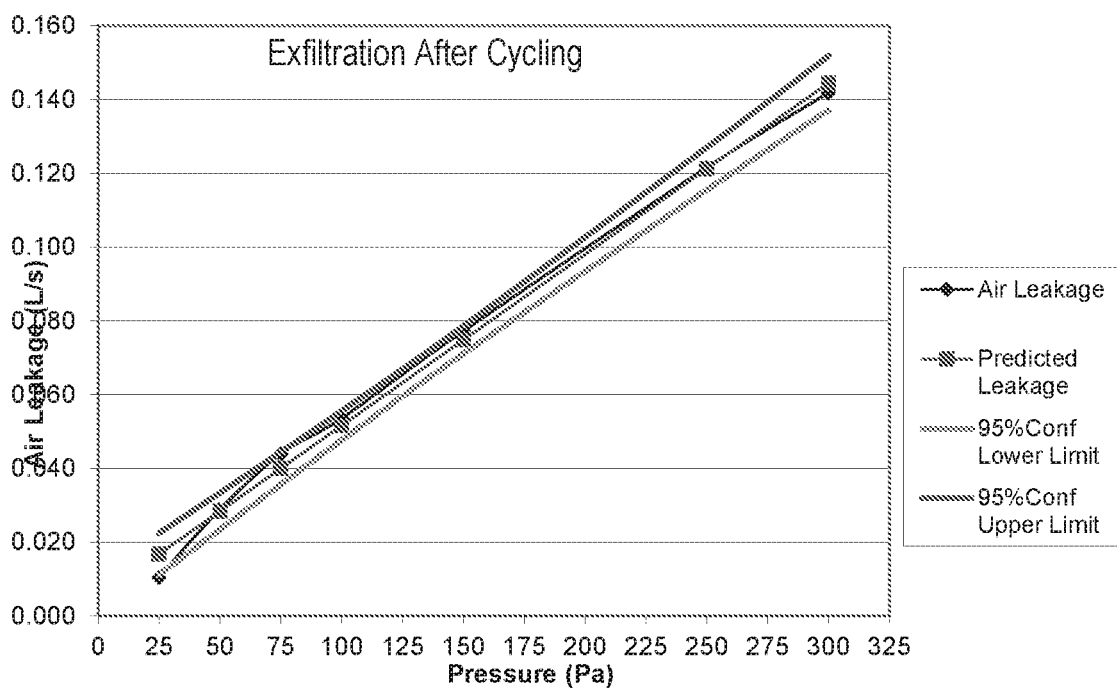
FIG. 18D is a graph of air leakage test results at exfiltration after cycling for DCLV blocks installed with adhesive and air barrier on an OSB substrate, according to certain embodiments of the present invention.

Once the adhesive has been applied within a section of the substrate, the veneer blocks may be pressed against the adhesive in courses, as best illustrated in FIGS. 13, 15, 16. Because of the adhesive hardness and the spacing between beads, the adhesive compresses down to approximately a ⅛ inch thickness, thereby forming a drainage plane between the veneer block and the substrate. This drainage plane is best illustrated in FIG. 14.

In certain cases, the adhesive installation system is an improvement over conventional installation methods (as described in the background section and shown in FIG. 1) because it may eliminate the need for using multiple layers of weather resistive barrier that are attached to the substrate with staples, using a metal lath over the weather resistive barrier so that a mortar coat can be applied to the substrate, and using mortar to install the veneer blocks. As a result, using the adhesive installation system, a two-person crew can install at least 135 ft$^2$ in three hours (equivalent to approximately 45 ft$^2$/hr) and may further install approximately 150 ft$^2$ in three hours (equivalent to approximately 50 ft$^2$/hr). Using a conventional installation system, as described in the background section and shown in FIG. 1, a typical installation rate is approximately 10 ft$^2$/hr with a two-person crew). Thus, in certain embodiments, the adhesive installation system is at least 3.5 times faster, and may be as much as 4-5 times faster, than conventional installation systems, while still providing a final installed product that meets or exceeds industry veneer installation standards.

Another advantage is that the skill set needed for the present installation system is not necessarily limited to skilled masons. A painter or other similarly skilled laborer can apply the air barrier to the substrate and apply the adhesive to the cured air barrier surface, as well as adhere courses of veneer blocks to the substrate.

EXAMPLES

To test the installation system, wall was constructed with 7—2"×4"×8' wooden studs secured onto a top and bottom 2"×4"×8' wood stud plate with 3" penny nails. As a result, the test area was 5.946 m$^2$. The wall was then screwed into a 2"×12" SFP wooden buck. ½" OSB was then attached horizontally to the exterior with 3" penny nails spaced approximately every 8" around the perimeter and 12" up each stud. The OSB board joint was then detailed with Dymonic 100 polyurethane sealant, then 75 wet-mils of ExoAir 230 air barrier was applied to the exterior. Once the membrane was completely cured, DCLV blocks were attached to the exterior with lines of Tremco illbruck SP350 adhesive spaced approximately every 3". A starter 2"×4" wood stud was fastened to the bottom of the buck to prevent the stones from sliding during installation. All sealants and adhesives were allowed to cure, and the 2"×4" wood stud started was removed before the start of testing.

Tests performed on the wall included: Pre-E2357 air leakage test per E283—1015-001; Wind load conditioning per E2357—1015-002; Post-E2357 air leakage test per E283—1015-003; Deflection test per E2357—1015-004; 15 min 137 Pa water leakage test per E331—1015-005; and 2 hour 300 Pa water leakage test per IBC 1403.2—1015-006.

Test Conditions: Test Temperature at Start(° F.): 67.912; Test Temperature at End (° F.): 69.733; Average Temperature (° F.): 68.492; Avg. Barometric Pressure (in. Hg): 30.415. Water penetration passed 2 hours at 300 Pa (6.27 psf). The air leakage test results are summarized in Table VI below. Additional test results for the air leakage are shown in FIGS. 18A-18D.

TABLE VI

Test Results.

| | Assembly Air Leakage Values @ 75 Pa (1.57 psf) | |
|---|---|---|
| | Air Leakage | Area Leakage Rate |
| Pre-Conditioning Infiltration | 0.04 L/s (0.09 cfm) | 0.007 L/s · m$^2$ (0.001 cfm/ft$^2$) |
| Pre-Conditioning Exfiltration | 0.03 L/s (0.07 cfm) | 0.006 L/s · m$^2$ (0.001 cfm/ft$^2$) |
| Post-Conditioning Infiltration | 0.04 L/s (0.08 cfm) | 0.006 L/s · m$^2$ (0.001 cfm/ft$^2$) |
| Post-Conditioning Exfiltration | 0.04 L/s (0.09 cfm) | 0.007 L/s · m$^2$ (0.001 cfm/ft$^2$) |

Different arrangements of the components depicted in the drawings or described above, as well as components and steps not shown or described are possible. Flexibility in design and construction of components, and of assemblies of components, are among the hallmarks of this invention, so many components and structures in addition to those depicted and described here are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A block comprising:
   a dry cast mixture comprising 35-45% by weight lightweight aggregate and 25-35% by weight fine sand and resulting in a dry cast veneer block having a weight less than or equal to 15 lb/ft$^2$.

2. The block of claim 1, wherein pigmentation is dispersed throughout the block.

3. An assembly of blocks of claim 1, wherein courses of the blocks are assembled without mortar between the courses.

4. A method of installing a plurality of blocks of claim 1 on a substrate, the method comprising:
  applying an adhesive to the substrate; and
  installing the plurality of blocks in courses by pressing the plurality of blocks against the adhesive.

5. The method of claim 4, wherein the substrate comprises wood, plywood, exterior sheathing, oriented strand board, drywall, chipboard, hardboard, cement board, concrete, blockwork, or fiber cement siding.

6. An installation system comprising:
  a substrate;
  a plurality of dry cast lightweight veneer blocks, each have a weight of less than or equal to 15 lb/ft$^2$, each of the blocks comprising 35-45% by weight lightweight aggregate and 25-35% by weight fine sand; and
  an adhesive to adhere the plurality of lightweight veneer blocks to the substrate.

7. The installation system of claim 6, wherein the substrate comprises wood, plywood, exterior sheathing, oriented strand board, drywall, chipboard, hardboard, cement board, concrete, blockwork, or fiber cement siding.

\* \* \* \* \*